(12) United States Patent
Kobayashi et al.

(10) Patent No.: US 6,502,176 B1
(45) Date of Patent: Dec. 31, 2002

(54) COMPUTER SYSTEM AND METHODS FOR LOADING AND MODIFYING A CONTROL PROGRAM WITHOUT STOPPING THE COMPUTER SYSTEM USING RESERVE AREAS

(75) Inventors: Yuji Kobayashi, Hadano (JP); Hideo Kira, Hadano (JP); Takuichi Hoshina, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/511,186

(22) Filed: Feb. 23, 2000

(30) Foreign Application Priority Data

Feb. 24, 1999 (JP) ............................................. 11-046761

(51) Int. Cl.[7] .......................... G06F 12/00; G06F 12/06; G06F 9/44; G06F 9/445
(52) U.S. Cl. ........................ 711/170; 711/171; 711/173; 717/168
(58) Field of Search ................................ 711/170, 171, 711/173; 717/168, 169

(56) References Cited

U.S. PATENT DOCUMENTS 5,359,730 A * 10/1994 Marron ....................... 709/100
5,574,926 A * 11/1996 Miyazawa et al. ............. 714/7

FOREIGN PATENT DOCUMENTS

| JP | 3-97030 | 4/1991 |
| JP | 8-95772 | 4/1996 |

* cited by examiner

Primary Examiner—Glenn Gossage
(74) Attorney, Agent, or Firm—Mattingly, Stanger & Malur, P.C.

(57) ABSTRACT

A computer system and methods for loading a program and for modifying a program loaded in a memory without stopping the computer system are disclosed. The computer system includes a memory having a first area storing the executable codes, a second area storing the data codes, a third area which is a reserve area for the first area, and a fourth area which is a reserve area for the second area. When a modification of the program is required, execution of the program is stopped temporarily and modified executable codes are loaded in at least the first area. Then, the execution of the program is resumed. The modified executable codes may be loaded in the first area and third area when the size of the modified executable codes is greater than the size of the first area. The control program may be an operating system (OS), for example, of the computer system.

20 Claims, 5 Drawing Sheets

COMPUTER SYSTEM AND METHODS FOR LOADING AND MODIFYING A CONTROL PROGRAM WITHOUT STOPPING THE COMPUTER SYSTEM USING RESERVE AREAS

BACKGROUND OF THE INVENTION

The present invention relates to a method for modifying a control program loaded in a memory of a computer system without stopping the computer system executing the control program.

Computer systems, such as general purpose computer systems (mainframe computer systems) and server computer systems, generally hold in their main memory a control program (such as an operating system (OS)) made of object codes having executable codes (instruction codes) and data codes mixed therein. The executable codes are constituted by a plurality of instructions, and the data codes are constituted by operand data required for execution of the executable codes. The computer systems carry out suitable processes under control of the control program being executed by the computer systems.

When the control program needs to be modified to incorporate additional functions or to remove errors (bugs), a conventional computer system controlled by the control program must be stopped temporarily. The computer system is then restarted for initial program loading of a suitably modified control program.

In recent years, however, it has become increasingly difficult to stop the computer system even temporarily due to needs of customers and other related demands. A need has been recognized to modify the control program while the system is in operation.

Illustratively, in Japanese Patent Application Laid-Open No. 03-97030, there is disclosed a technique for modifying a control program executed by a computer system without performing initial program loading of the modified control program to a main memory or without stopping the computer system. The disclosed technique apparently permits modifications merely on a limited scale of the control program.

SUMMARY OF THE INVENTION

The above-cited reference fails to address the following two points. First, the control program in the above cited reference is provided with relocatable address constants. Since an address location at which the control program is placed is not fixed, an address to be assigned to the control program must be set to the relocatable address constants when the control program is loaded in the main memory. Therefore, when the modifications of the control program cause modifications of address locations at which the data codes are stored, values to be set to the relocatable address constants must be modified accordingly. Second, addresses at which operand data are stored are generated and saved upon execution of the executable codes. Those addresses are reused for the stored operand data upon execution of executable codes. Therefore, when the modifications of the control program cause modifications of address locations at which the data codes are stored, those addresses also must be modified. Modifying addresses of the data codes requires stopping the computer system and performing initial program loading of the modified control program to a main memory. The above-cited reference does not specify how to deal with the above-mentioned problems. This means that the technique disclosed in the above-cited reference is not applicable to a large-scale modification of a control program involving address modifications of data codes.

It is therefore an object of the present invention to overcome the above-mentioned problems of the reference technique and to provide a method capable of effecting a large-scale modification of the control program without stopping the computer system which executes it.

In accomplishing this object of the present invention and according to one aspect thereof, there is provided a system and a method for modifying a program loaded in a memory. The program includes executable codes having instructions and data codes having operand data required for execution of the executable codes.

According to the system and the method, there is provided a memory having a first area storing the executable codes, a second area storing the data codes, a third area which is a reserve area for the first area, and a fourth area which is a reserve area for the second area. The executable codes are loaded in the first area and the data codes are loaded in the second area and the program is executed by the computer system. When a modification of the program is required, modified executable codes are provided. The execution of the program is stopped temporarily and the modified executable codes are loaded in the first area. Then the execution of the program is resumed.

These and other objects, features and advantages of the present invention will become more apparent in view of the following detailed description of the preferred embodiments in conjunction with the drawings.

DESCRIPTION OF THE PREFERRED EMBODIMENTS

Preferred embodiments of this invention will now be described in detail with reference to the accompanying drawings.

Figure 1:
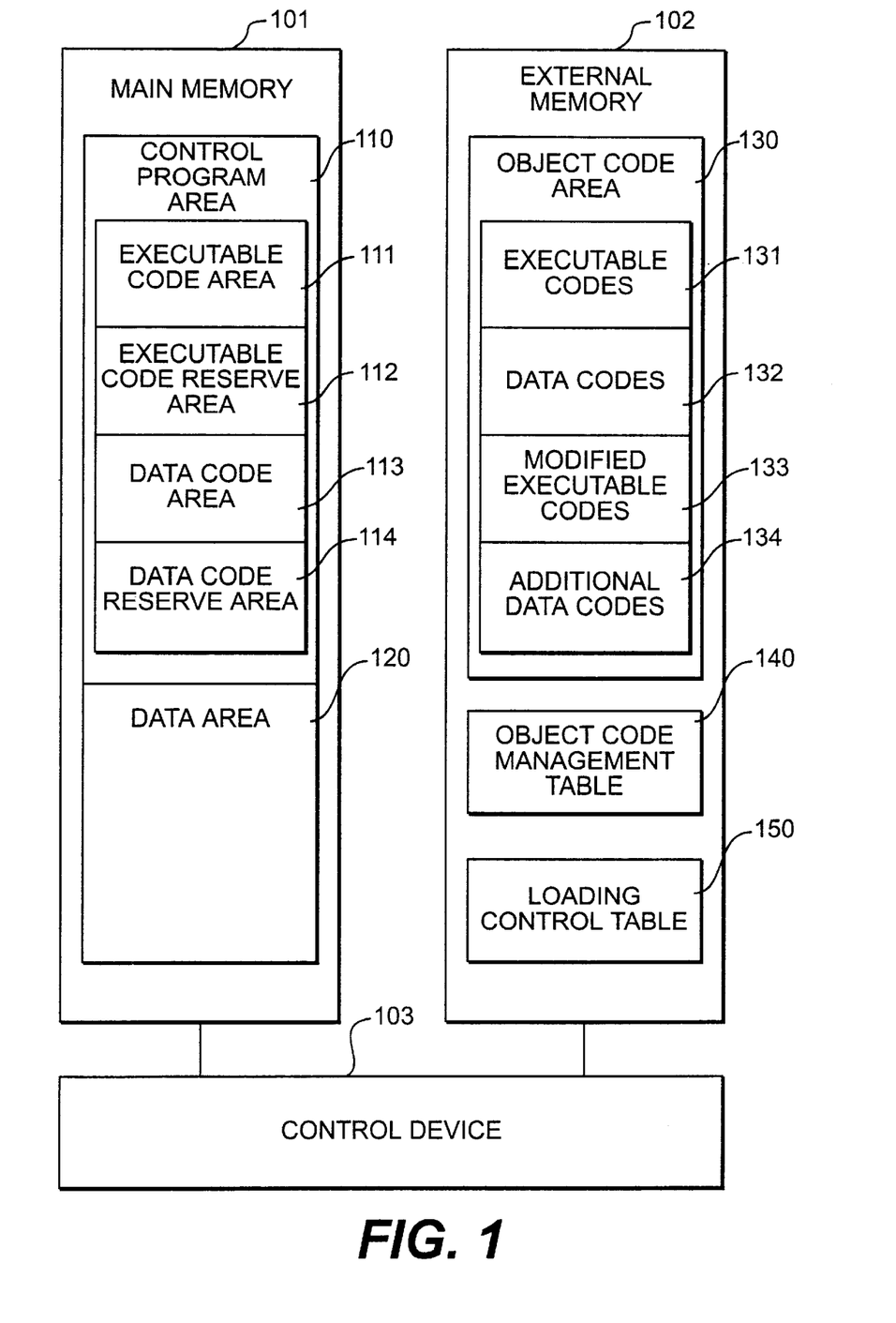
FIG. 1 is a block diagram of a computer system according to a preferred embodiment of the present invention.

FIG. 1 is a block diagram of a computer system according to a preferred embodiment of the present invention.

The computer system in FIG. 1 includes a main memory 101, an external memory 102 and a control device 103.

The main memory 101 includes a control program area 110 accommodating a loaded control program, and a data area 120 holding data being processed by the control program in the control program area 110. The control program area 110 further includes an executable code area 111, an executable code reserve area 112, a data code area 113, and a data code reserve area 114.

The external memory 102 includes an object code area 130, an object code management table 140 and a loading control table 150. The object code area 130 stores object codes including executable codes 131, data codes 132, modified executable codes 133, and additional data codes 134. The object code management table 140 is used for managing each of the codes 131 through 134 in the object code area 130. The loading control table 150 is used for controlling the loading of each of the codes 131 through 134 in the control program area 110 of the main memory 101.

Figure 2:
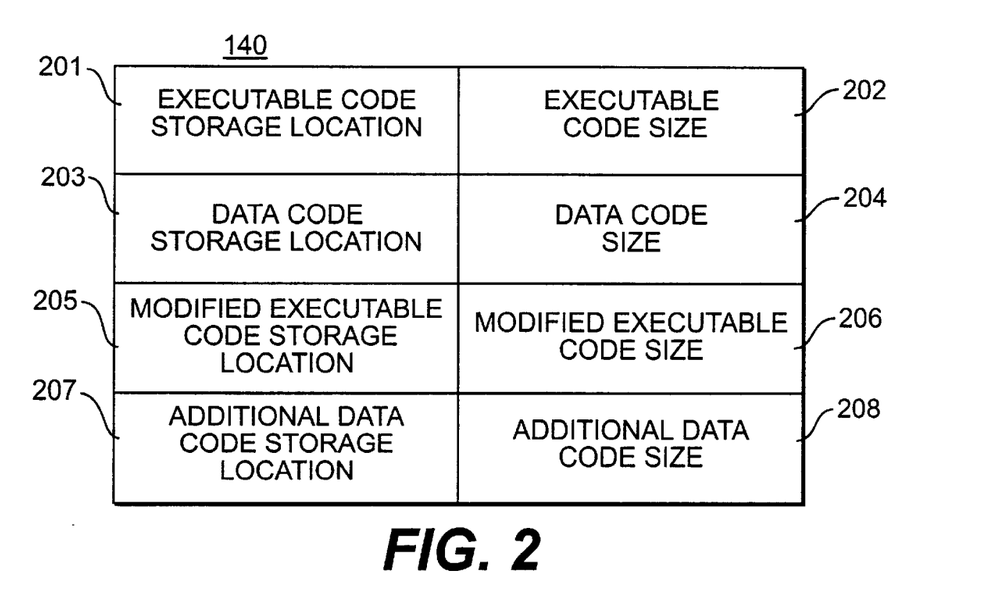
FIG. 2 is a schematic view illustrating a structure of an object code management table according to a preferred embodiment of the present invention.

The object code management table 140 holds information regarding storage locations in the external memory 102 at which the executable codes 131, data codes 132, modified executable codes 133 and additional data codes 134 are stored, and regarding the size of each code 131 through 134. As shown in FIG. 2, the object code management table 140 includes an executable code storage location information 201, an executable code size information 202, a data code storage location information 203, a data code size information 204, a modified executable code storage location information 205, a modified executable information size code 206, an additional data code storage location information 207, and an additional data code size information 208.

Figure 3:
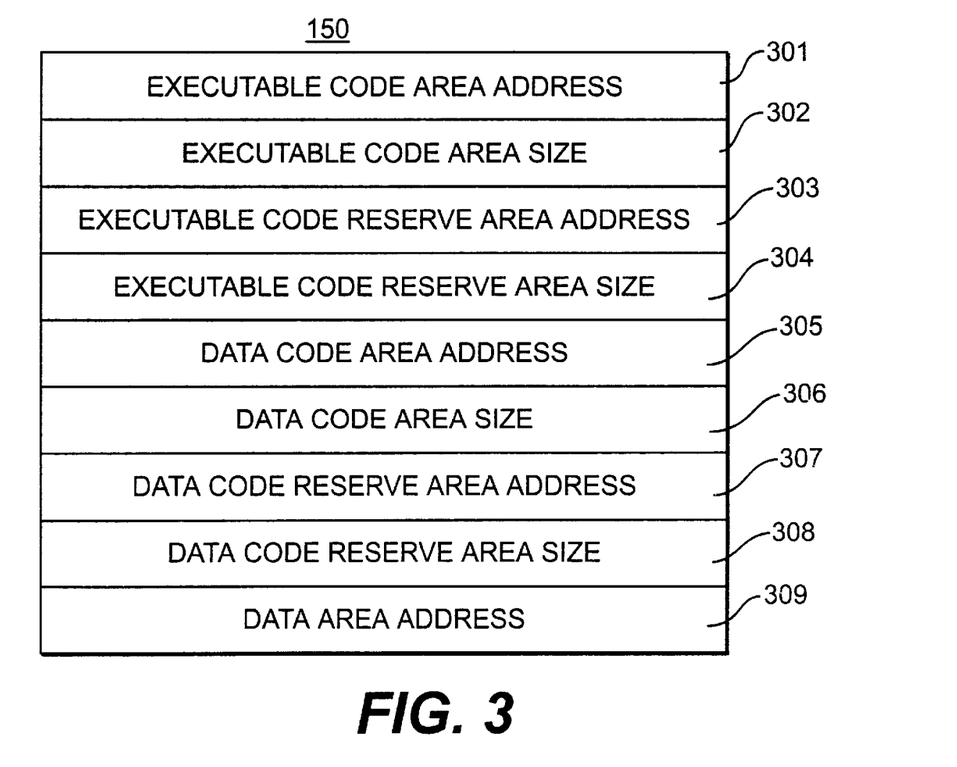
FIG. 3 is a schematic view illustrating a structure of a loading control table according to a preferred embodiment of the present invention.

The loading control table 150 holds information regarding addresses in the main memory 101 at which each area 111 through 114 included in the control program area 110 is arranged and regarding the size of each area 111 through 114. As illustrated in FIG. 3, the loading control table 150 includes an executable code area address information 301 designating a start address of the executable code area 111; an executable code area size information 302; an executable code reserve area address information 303 designating a start address of the executable code reserve area 112; an executable code reserve area size information 304; a data code area address information 305 designating a start address of the data code area 113; a data code area size information 306; a data code reserve area address information 307 designating a start address of the data code reserve area 114; a data code reserve area size information 308; and a data area address information 309 designating a start address of the data area 120.

Figure 6:
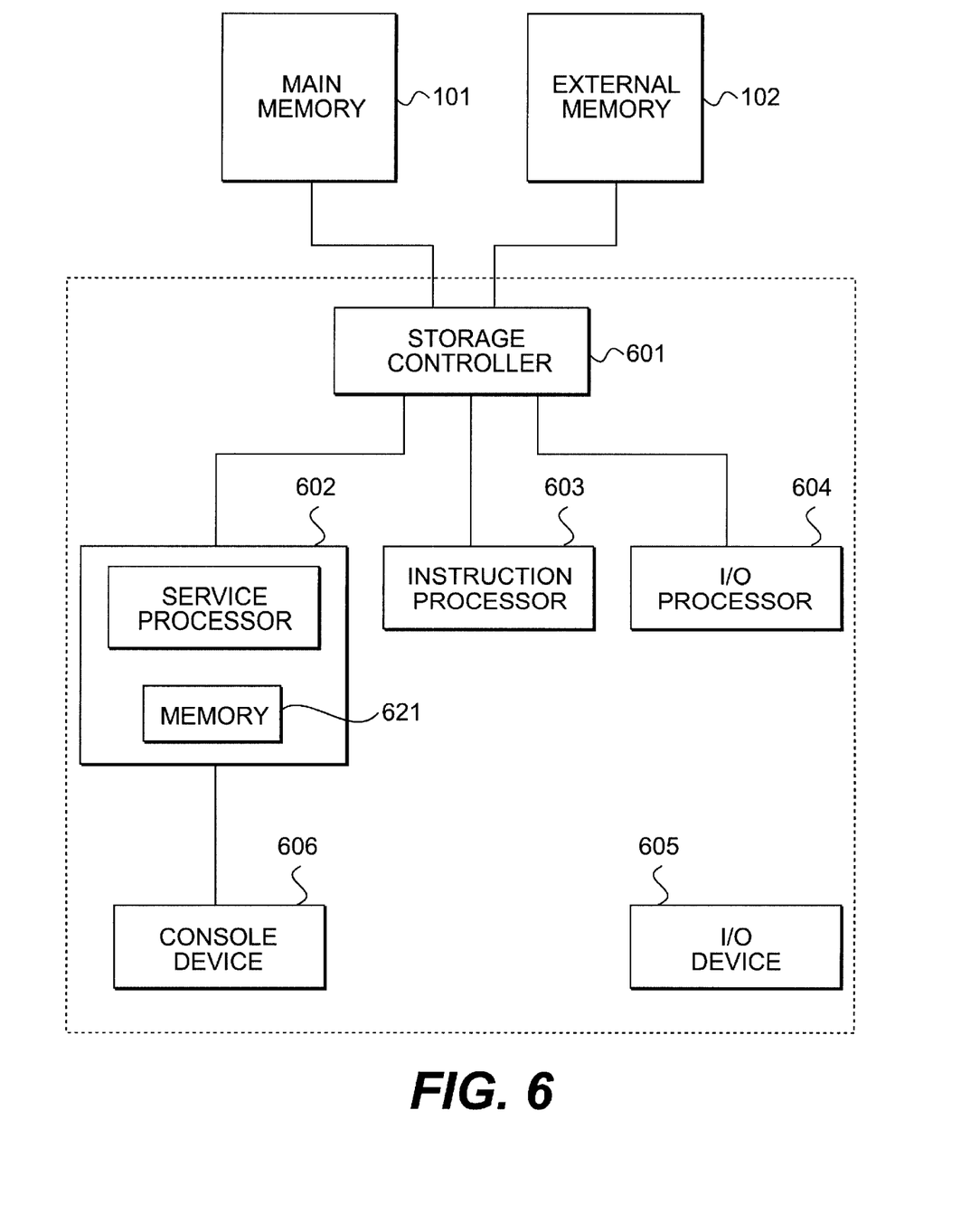
FIG. 6 is a block diagram of a computer system including a control device according to a preferred embodiment of the present invention.

As shown in FIG. 6, the control device 103 includes at least one storage controller 601 controlling storage operations to the main memory 101 and the external memory 102, a service processor 602 including a memory 621 which holds a program for performing the method of modifying the control program according to the preferred embodiment, at least one instruction processor 603 which executes the program loaded in the main memory 101, and at least one input/output processor (I/O processor) 604 and input/output device (I/O device) 605, for example. The input/output processor 604 controls an input/output operation to the input/output device 605. A console device 606 is connected to the service processor 602. The service processor 602 executes the program which is held in the memory 621 according to an instruction which is input through the console device 606 by an operator, and operates the method for modifying the control program according to the preferred embodiment. In other computer systems which do not have a service processor, one of the instruction processors could include the storage device which holds the program and performs the method of modifying the control program according to the preferred embodiment.

Figure 4:
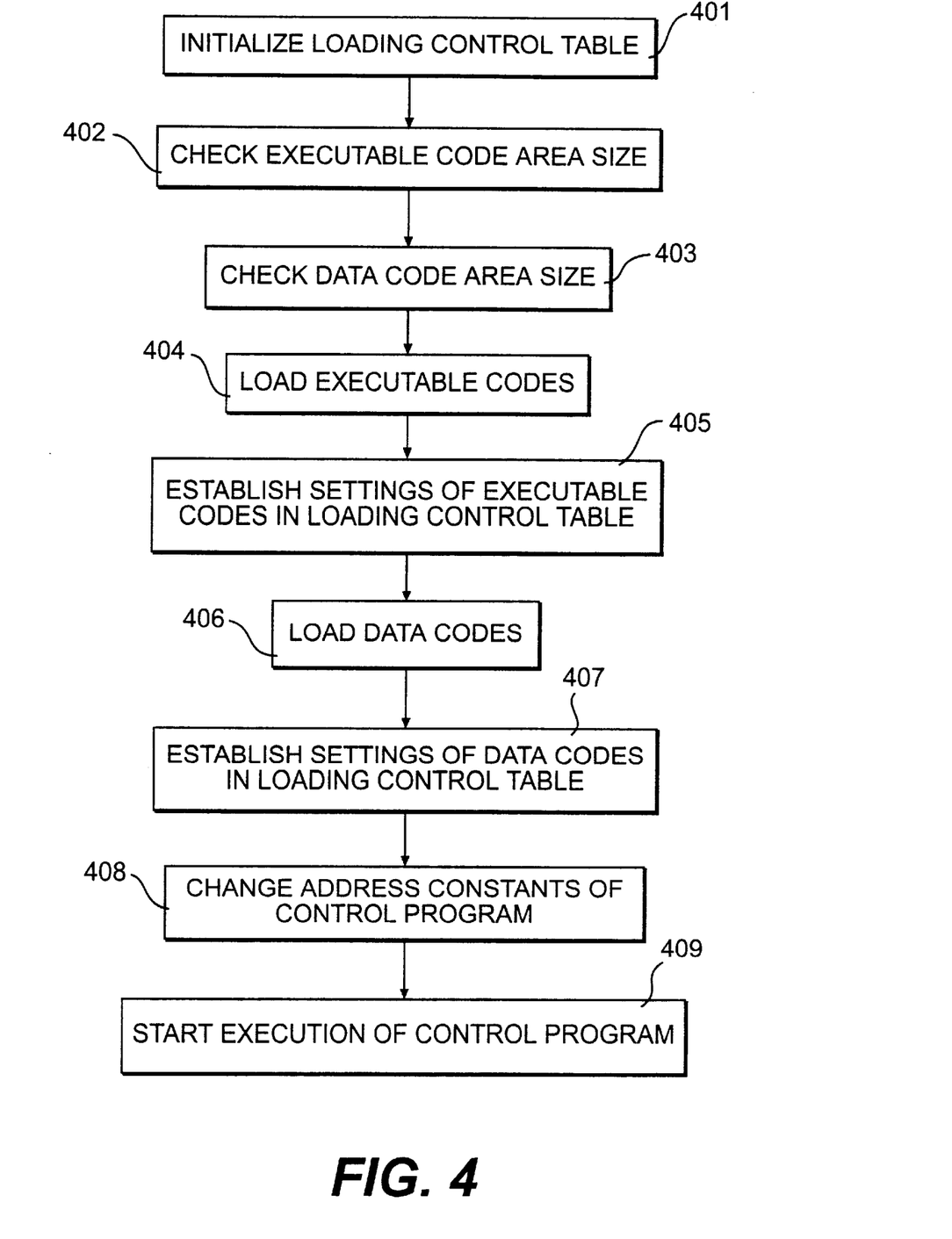
FIG. 4 is a flowchart of steps in which initial program loading of a control program is carried out.

A process of initial program loading on the computer system will now be described with reference to FIG. 4.

Before running the process of initial program loading, object codes which include the executable codes 131 and the data codes 132, are provided. The executable codes 131 have instructions to be executed by the control device 103. The data codes 132 have operand data required for execution of the executable codes 131. The object codes are input through the input/output device 605 and the input/output processor 604. The control device 103 divides the input object codes into the executable codes 131 and the data codes 132 and stores them in the object code area 130 of respective parts of the external memory 102. Additionally, the control device 103 sets the executable code storage location information 201, the executable code size information 202, the data code storage location information 203, and the data code size information 204 in the object code management table 140 of the external memory 102.

For initializing addresses of the executable codes, data codes and data to be loaded first, each start address of the executable code area 111, data code area 113 and data area 120 is determined by the control device 103. These addresses can be input through the input/output device 605 and the input/output processor 604. The control device 103 sets or initializes the executable code area address information 301, data code area address information 305, and data area address information 309 in the loading control table 150 of the external memory 102 (step 401). The control device 103 compares the executable code size information 202 and the size obtained by subtracting the executable code area address information 301 from the data code area address information 305. When a value of the executable code size information 202 is greater than the obtained size, i.e., when the size of the executable codes 131 to be loaded are greater than a total size of the executable code area ill and the executable code reserve area 112 (checked in step 402), the control device 103 halts the process of initial program loading. The control device 103 also compares the data code size information 204 and the size acquired by subtracting the data code area address information 305 from the data area address information 309. When the value of the data code size information 204 is greater than the acquired size, i.e., when the size of the data codes 132 to be loaded is greater than a total size of the data code area 113 and the data code reserve area 114 (checked in step 403), the control device 103 halts the process of initial program loading.

When the obtained size is greater than the value of the executable code size information 202, the control device 103 reads the executable codes 131 from the address location of the external memory 102 indicated by the executable code storage location information 201. The control device 103 loads the executable codes 131 into the executable code area 111 of the main memory 101 according to the address designated by the executable code area address information 301 (step 404). The control device 103 sets the size indicated by the executable code size information 202 in the loading control table 150 as the executable code area size information 302. The control device 103 also sets the address obtained by adding the executable code area size information 302 to the executable code area address information 301 in the loading control table 150 as the executable code reserve area address information 303. Further, the control device 103 sets the size acquired by subtracting the executable code reserve area address information 303 from the data code area address information 305 in the loading control table 150 as the executable code reserve area size information 304 (step 405). That is, the start address and the size of the executable code reserve area 112 is established in accordance with the size of the loaded executable codes 131.

The control device 103 reads the data codes 132 from the address location of the external memory 102 indicated by the data code storage location information 203, and loads them into the data code area 113 of the main memory 101 according to the address designated by the data code area address information 305 (step 406). The control device 103 sets the size indicated by the data code size information 204 in the loading control table 150 as the data code area size information 306. The control device 103 sets the address obtained by adding the data code area size information 306 to the data code area address information 305 in the loading control table 150 as the data code reserve area address information 307. Further the control device 103 sets the size acquired by subtracting the data code reserve area address information 307 from the data area address information 309 in the loading control table 150 as the data code reserve area size information 308 (step 407). That is, the start address and the size of the data code reserve area 114 are established in accordance with the size of the loaded data codes 132.

The executable codes 131 and the data codes 132 have relocatable address constants, since an address location, at which the object codes including them would be placed, is not fixed in advance. A real address assigned to the object codes must be substituted for the relocatable address constants when the object codes are loaded in the main memory 101. Therefore, the control device 103 substitutes addresses for relocatable address constants in the executable codes 131 and data codes 132 according to the executable code area address information 301 and the data code area address information 305, respectively (step 408). Then the instruction processor 603 included in the control device 103 starts to execute the control program (step 409).

According to the preferred embodiment of the present invention described above, each of the executable code reserve area 112 and the data code reserve area 114 are established in accordance with the sizes of the loaded executable codes 131 and the loaded data codes 132 upon initial program loading of the computer system.

Figure 5:
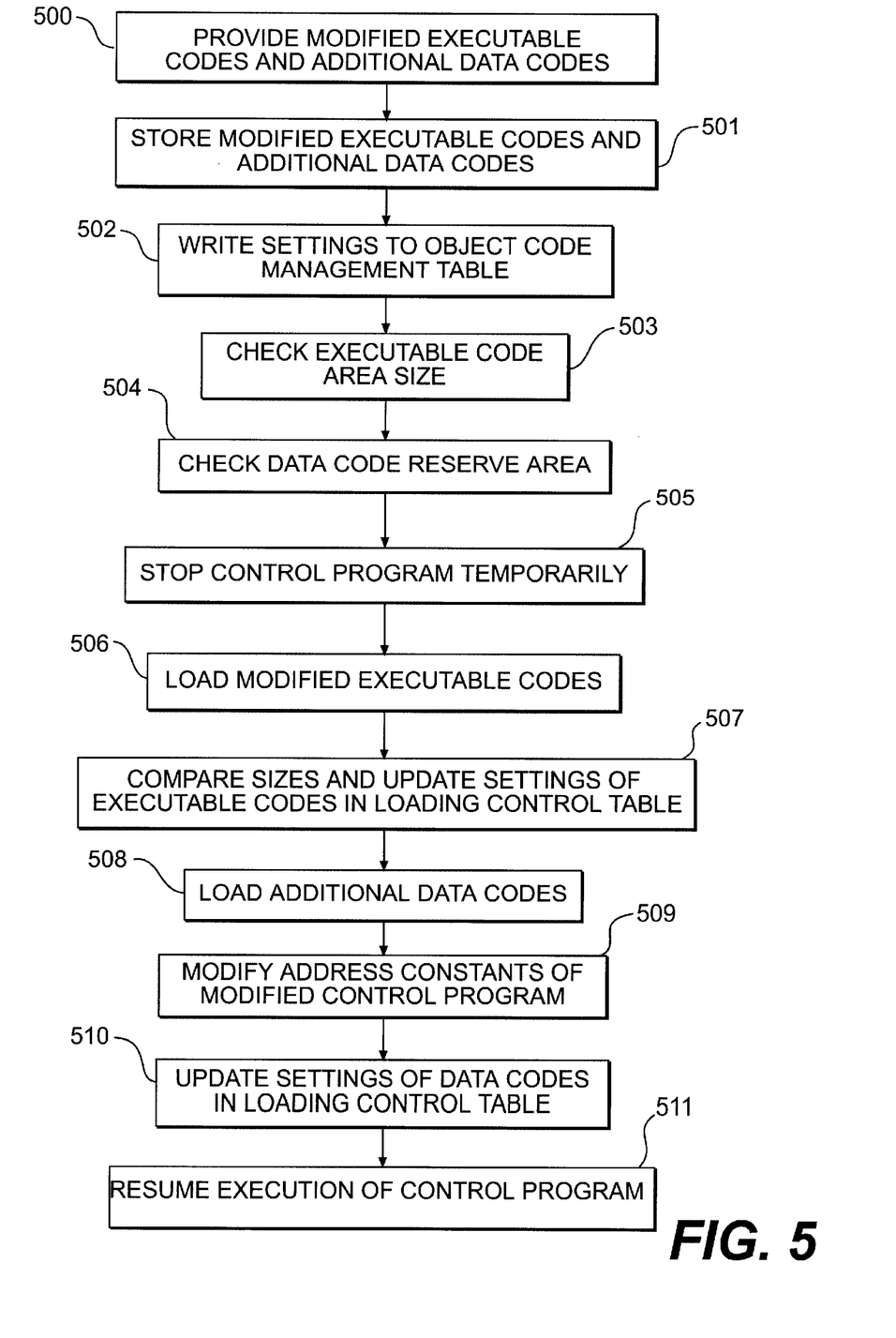
FIG. 5 is a flowchart of steps in which the control program is modified.

A process of modifying the control program following the initial program loading will be described below with reference to FIG. 5.

When the control program needs to be modified to incorporate additional functions or to remove errors (bugs), the modified executable codes 133, which correspond to the executable codes 131 added the additional functions or removed the errors suitably, are provided. The additional data codes 134 having additional operand data required for execution of the modified executable codes 133 are provided. When additional operand data are not needed for the execution of the modified executable codes 133, only the modified executable codes 133 are provided. The modified executable codes 133 and the additional data codes 134 are input through the input/output device 605 and the input/output processor 604. Additionally, the instruction is input to the service processor 602 through the console device 606 by the operator. The service processor 602 starts to execute the program for performing the method of modifying the control program according to the preferred embodiment.

The control device 103 stores the modified executable codes 133 and the additional data codes 134 into the object code area 130 of the external memory 102 (step 501). Then, the control device 103 sets the modified executable code storage location information 205, the modified executable code size information 206, the additional data code storage location information 207, and the additional data code size information 208 in the object code management table 140 of the external memory 102 (step 502). According to this step, the sizes of the modified executable codes and the additional data codes modified upon the control program modification are written to the object code management table 140 of the external memory 102.

The control device 103 compares or checks the modified executable code size 206 and the size obtained by adding the executable code area size information 302 to the executable code reserve area size information 304 (step 503). When a value of the modified executable code size information 206 is greater than the obtained size, the control device 103 halts the process of modifying the control program. The control device 103 also compares the additional data code size information 208 and the data code reserve area size information 308 (step 504). When the additional data code size information 208 is greater than the data code reserve area size information 308, the control device 103 also halts the process of modifying the control program. That is, when the reserve areas 112, 114 for the executable codes area 111 and the data codes area 113 are smaller in size than the modified executable codes 133 and the additional data codes 134, respectively, the control device 103 halts the process.

When the executable code reserve area 112 and the data code reserve area 114 are greater in size than the modified executable codes 133 and the additional data codes 134, respectively, the control device 103 advances to the next step. Illustratively, the control device 103 recognizes an appropriate interval in execution of the control program, and stores status information concerning the control program in execution at that point in the data area 120 of main memory 101. Then, the instruction processor 603 included in the control device 103 stops the execution of the control program temporarily (step 505). The appropriate interval is a point at which the control device 103 can normally resume executing the control program which is modified.

The control device 103 then reads the modified executable codes 133 from the address location of the external memory 102 indicated by the modified executable code storage location information 205. The control device 103 loads the modified executable codes 133 into the executable code area 111 of the main memory 101 according to the address designated by the executable code area address information 301 (step 506). When the size indicated by the modified executable code size information 206 is greater than the size indicated by the executable code area size information 302, the control device 103 stores the modified executable codes 133 in both of the executable code area 111 and a part of the executable code reserve area 112. The control device 103 resets the size indicated by the modified executable code size information 206 in the loading control table 150 as the executable code area size information 302. The control device 103 also resets the address acquired by adding the executable code area size information 302 to the executable code area address information 301 in the loading control table 150 as the executable code reserve area address information 303. In addition, the control device 103 resets the size obtained by subtracting the executable code reserve area address information 303 from the data code area address information 305 in the loading control table 150 as the executable code reserve area size information 304 (step 507).

When the additional data codes 134 are stored into the object code area 130 of the external memory 102, the control device 103 reads the additional data codes 134 from the address location of the external memory 102 designated by the additional data code storage location information 207. The control device 103 loads them in the data code reserve area 114 of the main memory 101 according to the address indicated by the data code reserve area address information 307 (step 508). In accordance with the executable code area address information 301, the data code area address information 305 and the data code reserve area address information 307, the control device 103 substitutes addresses for relocatable address constants in the modified executable codes 133 and the additional data codes 134 (step 509).

The control device 103 resets the size acquired by adding the additional data code size information 208 to the data code area size information 306 in the loading control table 150 as the data code area size information 306. The control device 103 also resets the address obtained by adding the data code area size information 306 to the data code area address information 305 in the loading control table 150 as the data code reserve area address information 307. In addition, the control device 103 resets the size acquired by subtracting the data code reserve area address information 307 from the data area address information 309 in the loading control table 150 as the data code reserve area size information 308 (step 510).

As described above, the executable code reserve area 112 and the data code reserve area 114 are established in the process of initial program loading. When the size of the modified executable codes 133 is greater than the size of the executable code area 111, the modified executable codes 133 are stored in both of the executable code area 111 and the executable code reserve area 112. When the additional data codes 134 are required for the execution of the modified executable codes 133, the additional data codes 134 are stored in the data code reserve area 114. Then, each size of the executable code area 111 and the data code area 113 is reset, whereby the control program is modified.

The control device 103 then reads the status information stored in the data area 120. The instruction processor 603 included in the control device 103 resumes executing the control program, which is modified as mentioned above, from the appropriate interval by using the status information (step 511).

According to the preferred embodiment as described above, the object codes of the control program are divided into executable codes 131 and the data codes 132 before running the process of the initial program loading. The executable codes 131 and the data codes 132 are stored into respective parts of the object codes area 130 of the external memory 102. In the control program area 110 of the main memory 101, the executable code area 111 and the data code area 113 are separately provided. Further the executable code reserve area 112 and the data code reserve area 114 are separately provided in the control program area 110. Upon initial program loading of the control program, the executable codes 131 are loaded into the executable code area 111 and the data codes 132 are loaded into the data code area 113. When it is necessary to modify the executable codes 131 of the control program, the modified executable codes 133 are provided and loaded in the executable code area 111 of the control program area 110. Accordingly, the control program is modified by loading the modified executable code 133 in the executable code area without rerunning the process of the initial program loading.

When the size of the modified executable codes 133 is greater than the size of the executable codes 131, the modified executable codes 133 are stored in both the executable code area 111 and the executable code reserve area 112. Accordingly, the address locations of the data codes 132 loaded in the data code area 113 are not affected by loading the modified executable codes 133 and are kept the same. That is, the loading of the modified executable code 133 does not cause the reloading of the data codes 132. Therefore, even if the size of the modified executable codes 133 is greater than the size of the executable codes 131, the control program is modified by loading the modified executable codes 133 in the executable code area 111 without rerunning the process of the initial program loading.

Furthermore, when the additional operand data are required for the execution of the modified executable codes 133, the additional data codes 134 are provided and loaded in the data code reserve area 114. As mentioned above, the address locations of the data codes 132 loaded in the data code area 113 are not affected by loading the additional data codes 134 and are kept the same. Accordingly, even if the additional data codes 134 are required, the control program is modified by loading the additional codes 134 in the data code reserve area 114 without rerunning the process of the initial program loading.

According to the preferred embodiment as described above, the control program is modified on a large scale without stopping the computer system and rerunning the process of initial program loading of the modified control program. Therefore, the availability of the control program can be enhanced and functions of the control program can be improved significantly.

While the invention has been described with respect to a best mode and preferred embodiments, for the specific advantages thereof, further embodiments, modifications and variations are contemplated according to the broader aspects of the present invention all according to the spirit and scope of the following claims.

What is claimed is:

1. A method for modifying a program loaded in a memory, wherein the program includes executable codes having instructions and data codes having operand data required for execution of the executable codes, said method comprising the steps of:

providing the memory with a first area for storing the executable codes, a second area for storing the data codes, a third area which is a reserve area for the first area, and a fourth area which is a reserve area for the second area;

loading the executable codes in the first area and loading the data codes in the second area;

starting execution of the program;

providing modified executable codes, when a modification of the program is required;

stopping execution of the program temporarily;

loading the modified executable codes in at least the first area; and resuming execution of the program.

2. A method for modifying a program according to claim 1, further comprising, before said step of loading the modified executable codes, a step of comparing sizes of the modified executable codes and the first area; and wherein said step of loading the modified executable codes comprises loading the modified executable codes in the first area and the third area when the size of the modified executable codes is greater than the size of the first area.

3. A method for modifying a program according to claim 2, wherein the loading of the modified executable codes in at least the first area is stopped, when the size of the modified executable codes is greater than a total size of the first area and the third area.

4. A method for modifying a program according to claim 2, wherein said step of providing the modified executable codes includes a step of providing additional data codes having additional operand data required for execution of the modified executable codes; and wherein said step of loading the modified executable codes includes a step of loading the additional data codes in the fourth area.

5. A method for modifying a program according to claim 4, wherein said step of comparing includes a step of comparing sizes of the additional data codes and the fourth area; and wherein the loading of the additional data codes in the fourth area is stopped, when the size of the additional data codes is greater than the size of the fourth area.

6. A method for loading a program in a memory, wherein the program includes executable codes having instructions and data codes having operand data required for execution of the executable codes, said method comprising the steps of:

providing the memory with a first area storing the executable codes, a second area storing the data codes, a third area which is a reserve area for the first area, and a fourth area which is a reserve area for the second area;

dividing the program into the executable codes and data codes;

loading the executable codes in the first area and loading the data codes in the second area;

providing modified executable codes, when a modification of the control program is required; and loading the modified executable codes in at least the first area.

7. A method for loading a program according to claim 6, further comprising, before said step of loading the modified executable codes, a step of comparing sizes of the modified executable codes and the first area; and wherein said step of loading the modified executable codes comprises loading the modified executable codes in the first area and the third area when the size of the modified executable codes is greater than the size of the first area.

8. A method for loading a program according to claim 7, wherein the loading of the modified executable codes in at least the first area is stopped, when the size of the modified executable codes is greater than a total size of the first area and the third area.

9. A method for loading a program according to claim 7, wherein said step of providing the modified executable codes includes a step of providing additional data codes having additional operand data required for execution of the modified executable codes; and wherein said step of loading the modified executable codes includes a step of loading the additional data codes in the fourth area.

10. A method for loading a program according to claim 9, wherein said step of comparing includes a step of comparing sizes of the additional data codes and the fourth area; and wherein the loading of the additional data codes in the fourth area is stopped, when the size of the additional data codes is greater than the size of the fourth area.

11. A computer system executing a program including executable codes having instructions and data codes having operand data required for execution of the executable codes, comprising:

a first memory including a first area for storing the executable codes, a second area for storing the data codes, a third area which is a reserve area for the first area, and a fourth area which is a reserve area for the second area;

a second memory holding a program to be loaded in said first memory; and a controller connected to said first memory and to said second memory for controlling the loading of the second program in the first memory, said controller reading executable codes and data codes from said second memory, and said controller loading the executable codes from the second memory into said first area and loading the data codes in said second area.

12. A computer system according to claim 11, wherein said second memory stores modified executable codes;

wherein said controller compares sizes of the modified executable codes and the first area, said controller reads the modified executable codes from the second memory and loads them in the first area and the third area, when the size of the modified executable codes is greater than that of the first area.

13. A computer system according to claim 12, wherein said controller stops the loading of the modified executable codes in the first area, when the size of the modified executable codes is greater than a total size of the first area and the third area.

14. A computer system according to claim 12, wherein said second memory stores additional data codes having additional operand data required for execution of the modified executable codes; and wherein said controller reads the additional data codes from the second memory and loads them in the fourth area.

15. A computer system according to claim 14, wherein said controller compares sizes of the additional data codes and the fourth area, and said controller stops the loading of the additional data codes in the fourth area, when the size of the additional data codes is greater than the size of the fourth area.

16. A computer readable recording medium having stored thereon a first program capable of modifying a second program stored in a memory of a computer that includes executable codes having instructions and data codes having operand data required for execution of the executable codes, the memory having a first area for storing the executable codes, a second area for storing the data codes, a third area which is a reserve area for the first area, and a fourth area which is a reserve area for the second area;

the program being capable of performing a method comprising the steps of:

stopping the computer executing the second program temporarily;

loading modified executable codes in at least the first area when a modification of the second program is required;

starting the computer executing the second program.

17. A computer readable recording medium according to claim 16, further comprising, before said step of loading the modified executable codes, a step of comparing sizes of the modified executable codes and the first area; and wherein said step of loading the modified executable codes comprises loading the modified executable codes in the first area and the third area when the size of the modified executable codes is greater than the size of the first area.

18. A computer readable recording medium according to claim 17, wherein the loading of the modified executable codes in at least the first area is stopped, when the size of the modified executable codes is greater than a total size of the first area and the third area.

19. A computer readable recording medium according to claim 17, wherein said step of providing the modified executable codes includes a step of providing additional data codes having additional operand data required for execution of the modified executable codes; and wherein said step of loading the modified executable codes includes a step of loading the additional data codes in the fourth area.

20. A computer readable recording medium according to claim 19, wherein said step of comparing includes a step of comparing sizes of the additional data codes and the fourth area; and wherein the loading of the additional data codes in the fourth area is stopped, when the size of the additional data codes is greater than the size of the fourth area.

* * * * *